United States Patent [19]

Wally, Jr. et al.

[11] Patent Number: 4,847,664

[45] Date of Patent: Jul. 11, 1989

[54] CHASE HOLDING MECHANISM FOR CAMERA/PROJECTOR MACHINES

[76] Inventors: Joseph H. Wally, Jr., 2801 West 68th St., Shawnee Mission, Kans. 66208; Herbert W. Pace, 12218 W. 79th St., Lenexa, Kans. 66215

[21] Appl. No.: 154,953

[22] Filed: Feb. 10, 1988

[51] Int. Cl.⁴ ............... G03B 27/62; G03B 27/64; G03B 27/44; G03B 27/32

[52] U.S. Cl. ............... 355/76; 355/54; 355/77

[58] Field of Search ............... 355/18, 53, 54, 75, 355/76, 77; 353/57

[56] References Cited

U.S. PATENT DOCUMENTS

| | | | |
|---|---|---|---|
| 3,639,054 | 2/1972 | Wally, Jr. | 355/18 |
| 3,645,621 | 2/1972 | Wally, Jr. | 355/76 |
| 3,695,760 | 10/1972 | Orr | 355/53 X |
| 3,734,615 | 5/1973 | Wally, Jr. | 355/76 |
| 3,762,816 | 10/1973 | Wally, Jr. | 355/76 X |
| 3,834,811 | 9/1974 | Rathburn | 355/18 |
| 3,837,742 | 9/1974 | Wally, Jr. | 355/53 X |
| 3,920,333 | 11/1975 | Wally, Jr. | 355/76 |
| 3,950,095 | 4/1976 | Bouygues et al. | 355/53 X |
| 3,998,546 | 12/1976 | Wally, Jr. et al. | 355/53 |
| 4,473,291 | 9/1984 | Wally, Jr. | 355/18 |
| 4,582,406 | 4/1986 | Wally, Jr. | 353/57 |
| 4,609,285 | 9/1986 | Samuels | 355/53 X |

Primary Examiner—Richard A. Wintercorn

[57] ABSTRACT

A three point suspension system and clamping mechanism for holding the face of a chase perpendicular to the optical axis of a multiple imaging camera/projector. The chase is equipped with pins which project from it and are located to bear against three pegs which project from the chase carrier of the machine to provide three point contact between the chase and chase carrier. The tips of the pins are adjusted to define a plane that is parallel to the plane of the glass panel on the chase which receives the flat copy to be photoreproduced. The ends of the pegs lie in a common plane which is perpendicular to the optical axis so that the glass panel of the chase is also maintained normal to the optical axis. The clamping mechanism is operated by pneumatic cylinders and allows the chase to be quickly replaced or rotated to a different orientation.

33 Claims, 3 Drawing Sheets

Fig. 6.
16 - PAGE FLAT WITH TRIM

Fig. 7.
8 - PAGE FLAT WITH TRIM

CHASE HOLDING MECHANISM FOR CAMERA/PROJECTOR MACHINES

BACKGROUND OF THE INVENTION

This invention relates generally to the field of photoreproduction equipment and more particularly to an improved subject holder for holding the copy in multiple imaging camera/projectors.

U.S. Pat. Nos. 3,998,546 to Walley et al. and 4,582,406 to Wally disclose pre-press photoreproduction machines which are used to produce multiple image film flats or offset plates from either reflection copy, line transparencies or halftone films. This type of equipment is commonly referred to as a step and repeat camera/projector, and it often uses both front lighting for reflection copy and back lighting for images that have been previously exposed on film.

For various reasons, step and repeat camera/projectors have essentially replaced the prior procedure which involved hand "stripping" of small film negative segments. With modern photoreproduction machines, all of the image components are exposed to a single piece of film or a single offset plate, thus preventing the components from being out of registration as among the color separations used in halftone printing of multiple colors. Currently, high quality printing work of the most demanding character is performed with camera/projectors of this type, including the printing of books, magazines, labels, and a wide variety of advertising materials. The firms which use this type of equipment are among the largest and most competitive in the industry, and the speed with which the printing work is completed is highly important. Accuracy and quality are equally if not more important.

Machines of the type disclosed in the aforementioned patents, when equipped with state of the art lenses and lighting, make it possible for halftone work to be completed with retention of halftone dots at both ends of the scale; i.e., 1% dots in the shadow regions and 99% dots in the highlight areas. However, this high degree of accuracy in the photoreproduction process taxes the capabilities of the optical system, the chemistry, the film, the printing presses and the craftsmen who do the work. High quality equipment and superior workmanship are essential to achieving the desired results.

An important consideration with respect to achieving highly accurate photoreproduction is the relatively small depth of focus of the precision lenses that are used in the best equipment. At present, extremely high quality lenses have a depth of focus that is not more than 0.005 inch (plus or minus 0.0025 inch from optimum focus). Obtaining accuracy on this order is difficult even in small devices and is extremely difficult in large camera/projectors which can weight up to two tons and measure 14 or 15 feet long. For high quality work to be performed successfully, both the copy and the film that is to exposed must be held in a flat condition in planes which are parallel to each other and perpendicular to the optical axis with 0.005 inch. Thus, the mechanical features of the camera/projector must conform to an extremely high level of accuracy and geometric integrity or the small depth of focus of the lens will have a detrimental effect rather than a beneficial one.

The copy which is photographically reproduced is held by vacuum on a chase which may be opaque for reflection copy. However, when the copy is a transparency, the chase must have a clear glass center so that light can be projected through the chase and the transparent copy held on it. Typically, each camera/projector is equipped with several chases which are used alternately to hold different types and sizes of copy. For example, a chase used in the printing of lottery tickets would have a small glass panel at its center, while a longer yet somewhat narrow glass panel would be needed for printing canned food labels. A chase used for a double page advertising spread in an 8½×11 inch magazine would have a glass panel in its center measuring about 12×18 inches so that an 11×17 inch film transparency could be accommodated with extra space provided at the edges to achieve a bleed trim where a picture or copy runs off the edge of the page.

Figure 6:
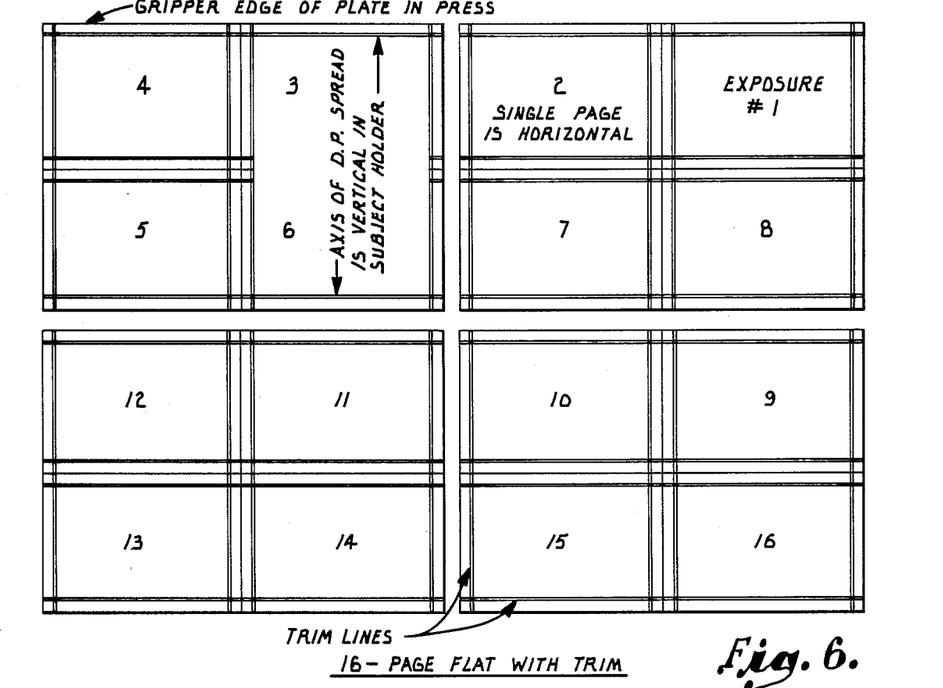
FIG. 6 is a diagrammatic view of the arrangement of the sheets in a 16 page film flat with trim.
Figure 7:
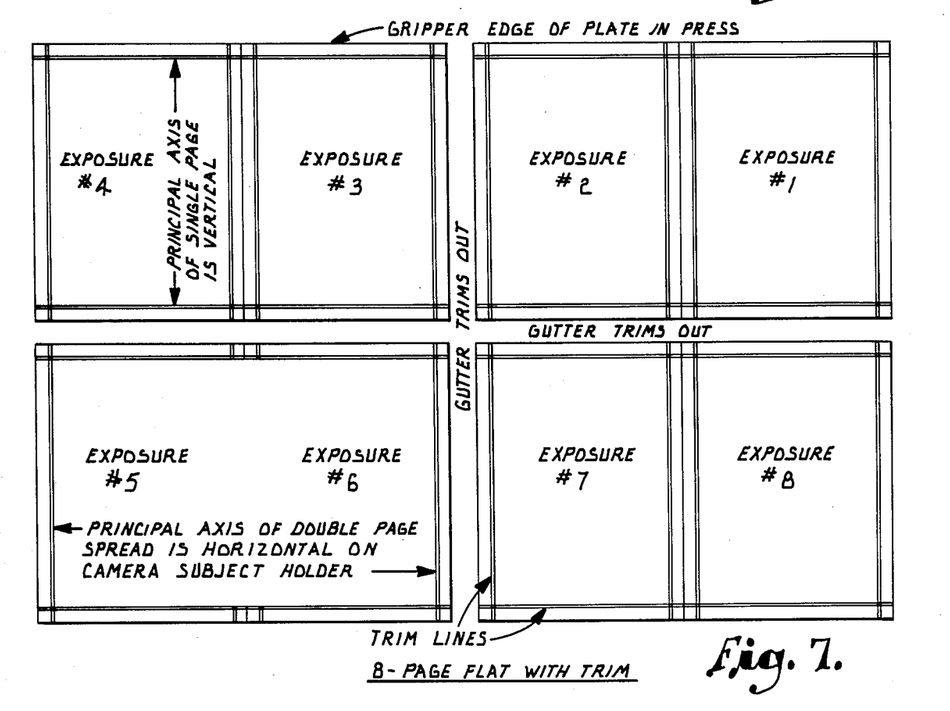
FIG. 7 is a diagrammatic view of the arrangement of the sheets in an 8 page film flat with trim.

Each chase is square but has a rectangular aperture which must be positioned at times with its long axis horizontal and at other times with its long axis vertical. For example, an 8 page film plate having each page 8½×11 inches is made with each single page oriented vertically and each double page oriented horizontally, as shown in FIG. 7 of the accompanying drawings. In a 16 page film flat or plate, the single pages are horizontal and a double page spread is vertical, as shown in FIG. 6.

The chase is normally constructed from aluminum plate which is milled on both faces. Even when the milling and finishing operations are carried out properly, it is impossible to maintain the faces of the chase perfectly flat. Moreover, the aperture in the center of the chase detracts from the structural integrity of the chase and can create warping and other distortions. A glass panel about ¼ inch thick is normally applied to the aperture by seating it on a shoulder around the aperture and holding it in place with liquid silicone rubber or another glazing material. The thin glass pane is likely to be thinner at some places than at others, and the bed of silicone rubber is inevitably thicker at some areas than at other areas. The result of these imperfections is that the glass and the face of the chase are not parallel.

These problems are compounded by the way in which the chase has traditionally be held on the chase carrier. Eight bolts are usually spaced arounmd the edge of the chase carrier and are threaded into the chase to hold the chase against the face of the chase carrier and thus achieve a reasonable degree of flatness. However, the face of the chase carrier is not exactly flat and is not necessarily perpendicular to the axis of the optical system. Also, the chase is not flat and the glass is not parallel to its face in any event. Thus, when the chase is in place, the glass panel can be displaced considerably from a perpendicular relationship to the optical axis, and this condition can create substantial inaccuracies, particularly with high quality lenses. If the glass panel which receives the copy is more than 0.0025 inch away from a perpendicular relationship to the optical axis, the short depth of focus of the lens can actually have a detrimental effect and the quality of the finished work suffers accordingly.

This is true if the camera operator carefully applies the mounting bolts. The accuracy is even worse if the bolts are applied improperly or if less than all of them are used. Often, the camera operator is under considerable pressure to quickly finish a high volume of work. By way of example, it is not uncommon for book or magazine pages to be shot at rates up to six per minute, and the chase must be replaced many times and rotated 90° many more times during the course of a day's work.

With this type of time pressure on the camera operator, it is highly tempting for him to attempt to "short cut" the nearly five minutes that are required to remove all eight bolts and then thread them back in after the chase has been replaced or rotated. Even if the camera operator properly uses the bolts, valuable time is required each time the chase is replaced or rotated.

The time pressure under which camera operators often work leads them to use less than all of the bolts, and many operators apply only four bolts as a matter of course. Since four bolts are unable to secure the entire periphery of the chase against the chase carrier, the chase is not held properly and can warp rather severely. Then, the depth of focus of the lens is exceeded by the offset and warpage of the plane of the copy that is to be shot, and the dot retention in the film can be corrupted well beyond acceptable limits.

SUMMARY OF THE INVENTION

The present invention is directed to a novel arrangement for holding a chase such that the face which receives the copy is oriented perpendicular to the optical axis of the camera/projector with a degree of accuracy within the limits required by state of the art lenses. At the same time, the chase can be replaced with another chase or rotated 90° much more quickly and easily than has been possible in the past.

In accordance with the invention, a three point suspension system is provided for holding the chase on the chase carrier. The three points of contact define a plane that is both perpendicular to the optical axis and parallel to the copy holding face of the chase, and the copy is thus perpendicular to the optical axis within limits that are less than the 0.005 inch depth of focus of the lens. The chase has three strategically located pins which are threaded to project from the rear face of the chase until their tips lie in a plane that is parallel to the flat face of the chase (which is normally a glass pane). Three pegs which project from the chase carrier are located with their ends occupying a plane that is known to be perpendicular to the optical axis of the camera/projector. Consequently, when the chase is secured to the chase carrier with the tips of the pins held in contact with the ends of the pegs, the copy receiving face of the chase is oriented perpendicular to the optical axis.

A novel clamping system for holding the chase is operated by pneumatic cylinders. The rod ends of the cylinders are equipped with clamps which are drawn against the chase adjacent to the three contact points when the cylinders are retracted. Because the clamping force is applied over the contact points of the three point suspension system, the contact points are securely held against one another and the clamping force does not tend to deform the chase. The clamps are constructed to be easily grasped in the hand, and they can be turned so that the chase can be removed and replaced when necessary. The upper two clamps serve another purpose in that they restrain the chase against inadvertently falling forwardly off of the chase carrier when the cylinders are extended.

It is a particular feature of the invention that the chase is equipped with two additional pins which provide additional contact points allowing the chase to be rotated 90° and still held by the three point suspension system. This permits the chase to be located with the long axis of the copy either horizontal or vertical. One of the pins at the corner area of the chase serves as a contact point in both orientations of the chase, thus simplifying the construction and reducing the possibility of inaccuracy.

DESCRIPTION OF THE DRAWINGS

In the accompanying drawings which form a part of the specification and are to be read in conjunction therewith and in which like reference numerals are used in indicate like parts in the various views.

DETAILED DESCRIPTION OF THE INVENTION

Figure 1:
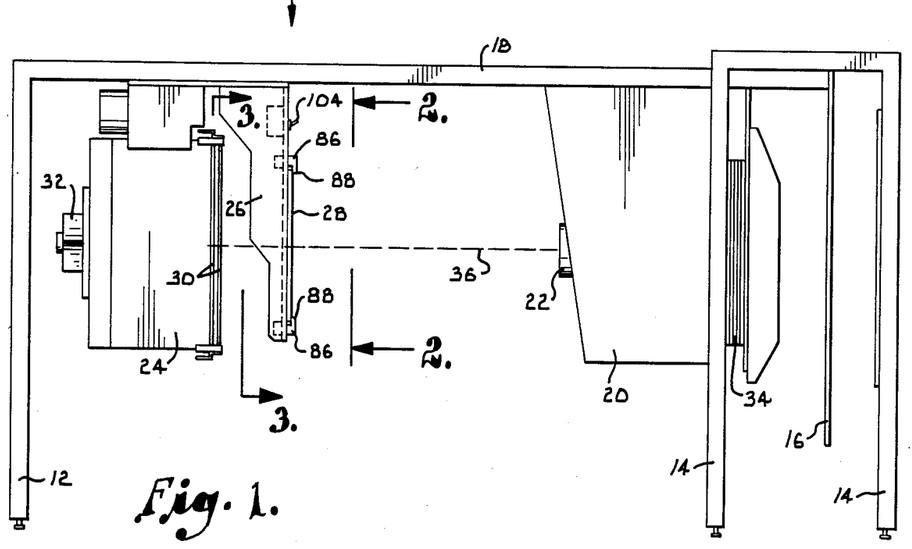
FIG. 1 is a side elevational view of a multiple image camera/projector which is equipped with a chase holding mechanism constructed according to a preferred embodiment of the present invention.

Referring now to the drawings in more detail and initially to FIG. 1, the present invention is directed to an improved chase holding arrangement which is useful in a multiple image camera/projector generally identified by numeral 10. The camera/projector 10 includes a pair of vertical support posts 12 at one end and four support posts 14 at the opposite end. The posts 14 on the end of the machine provide support for a vertical easel 16 which receives and holds film that is to be exposed. A pair of overhead structural members 18 are supported in a horizontal orientation by the posts 12 and 14 and serve as tracks along which an optical compartment 20 may be adjusted. The optical compartment carries an objective lens 22 which focuses light on the film that is held on the easel 16. A boxlight 24 is also suspended from the overhead track 18 and may be adjusted along the track toward and away from the optical compartment.

A chase carrier is mounted under the overhead track 18 between the boxlight 24 and the optical compartment 20 and may be adjusted along the track. The chase carrier 26 receives and holds a chase 28 which in turn holds the copy bearing images that are to be photoreproduced. A pair of transparent panels 30 are located between the boxlight and chase in order to diffuse the light that is emitted by the boxlight and filter it. A fan 32 is provided for cooling of the interior of the boxlight 24.

When the camera/projector 10 is operated in the projection mode, a transparency is mounted on the chase 28. Light is generated by lamps (not shown) within the boxlight 24, and the light is diffused and filtered by the filter panels 30 prior to being projected through the transparency held on the chase. The light is focused by the objective lens 22 on the film (or plate) which is held on the easel 16. An expansible and retractible bellows 34 is provided on the end of the optical head located nearest to the easel.

As thus far described, the camera/projector 10 is constructed in generally the same manner disclosed in U.S. Pat. Nos. 3,998,546 and 4,582,406 to which reference may be made for a more detailed description of the general components of the machine.

In accordance with the present invention, an improved arrangement is provided for holding the chase 28 on the chase carrier 26. It is important to recognize that high quality photoreproduction requires that the film or plate which is held by vacuum on the easel 16 be located in a plane which is perpendicular to the plane of the flat copy held on the chase 28. At the same time, the planes of both the film and the copy must be perpendicular to the horizontal optical axis 36 of the machine. The copy shold also be substantially centered on the optical axis 36. The lens 22 is preferably a state of the art high quality lens having a depth of focus no more than about 0.005 inch. Accordingly, if the copy held on the chase 28 is tilted from a perpendicular relationship to the optical axis 36 by more than plus or minus 0.0025 inch, the quality of the finished product can suffer.

Figure 5:
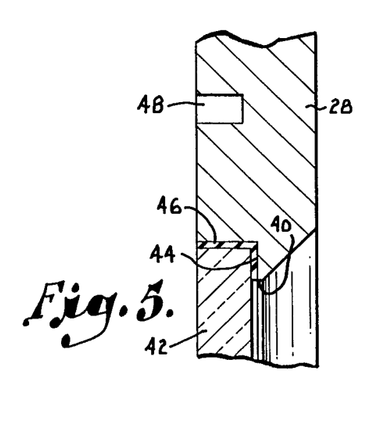
FIG. 5 is a fragmentary sectional view on an enlarged scale taken generally along line 5—5 of FIG. 2 in the direction of the arrows.

The present invention provides a three point suspension system for mounting of the chase 28 on the generally flat front face 38 of the chase carrier 26. The chase 28 is constructed from a square aluminum plate which approximately ¼" thick and milled on both of its generally flat surfaces. The center portion of the chase is cut away to provide a rectangular aperture 40 in which a planar glass panel 42 is mounted. The panel 42 is rectangular and, as best shown in FIG. 5, seats on a flat shoulder 44 that extends around the aperture 40. The edge portions of the glass panel 42 seat in a bed of liquid silicone rubber 46 or another suitable material which, upon curing, is able to securely and rigidly retain the glass panel in place on the chase.

The chase 28 is thus formed by a rigid metal frame which surrounds the central rectangular glass panel 42. The front face of the chase is provided with a vacuum channel 48. Vacuum is applied to the vacuum channel 48 and serves to hold flat copy (not shown) in a flat condition against the glass panel 42 so that light can be projected through a transparency during the photoreproduction process. The chase carrier 26 has a square opening 50 that registers with the glass panel 42 so that light can be projected through the copy held on the chase in the projection mode of operation. It should be noted that the chase can receive reflection copy and that front lighting can be provided for reflection off of the copy. Reflection copy does not require the glass panel 42 on the planar front face of the chase.

Figure 2:
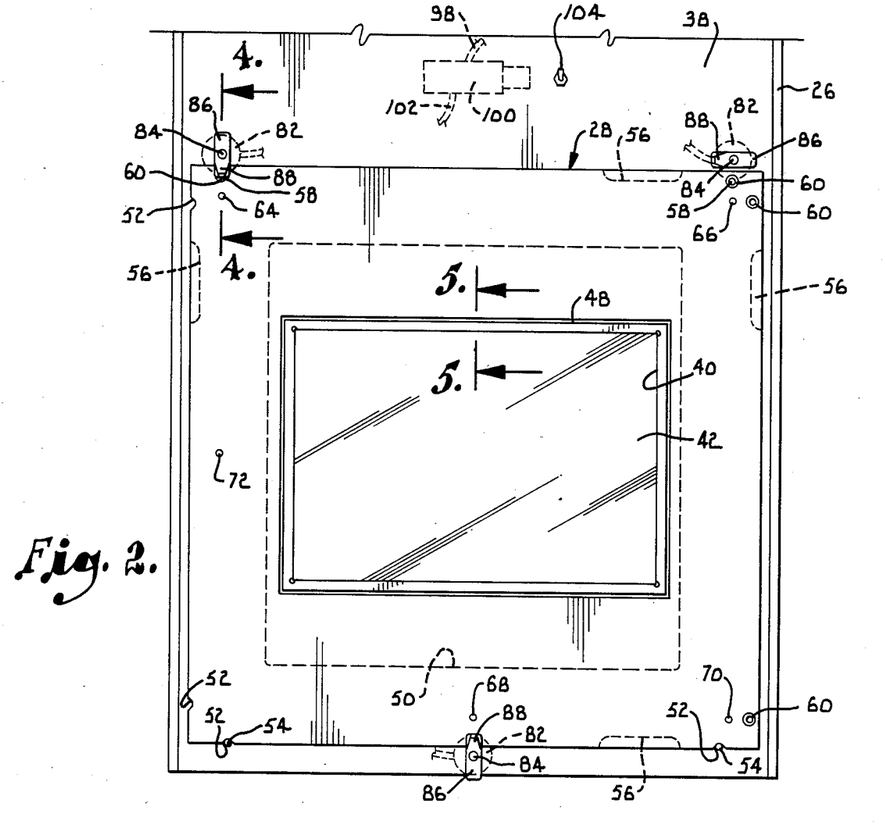
FIG. 2 is a fragmentary front elevational view of the chase and chase carrier on an enlarged scale taken generally along line 2—2 of FIG. 1 in the direction of the arrows.

Two adjacent edges of the chase 28 are each provided with a pair of semi-circular notches 52. The notches 52 on each edge are spaced apart such that they can be seated on a pair of horizontal pins 54 which project from the front face 38 of the chase carrier. This provides for initial positioning of the chase. The provision of the notches 52 in two edges of the chase which are oriented at 90° to one another permits the chase to be oriented as shown in FIG. 2 with the long axis of the glass panel 42 oriented horizontally. Alternatively, when the other pair of notches 52 are seated on pins 54, the long axis of the glass panel 42 is rotated 90° from the position of FIG. 2 such that it is oriented vertically. The edges of the chase 28 are provided with cutouts 56 which serve as hand grips to facilitate handling of the chase.

Figure 4:
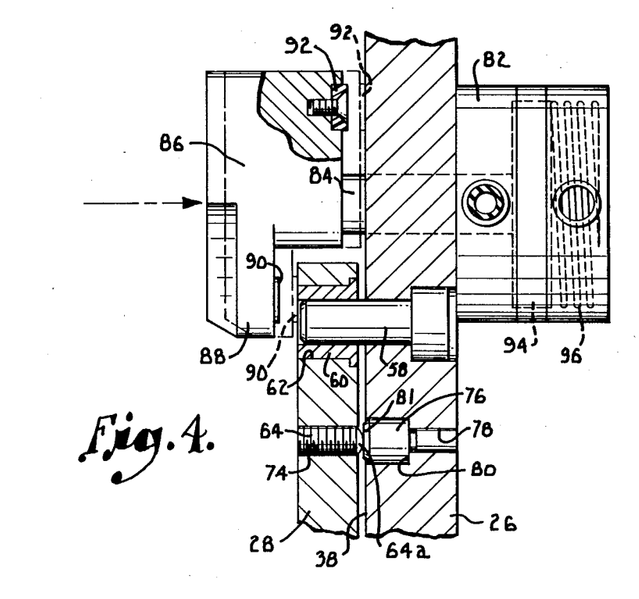
FIG. 4 is a fragmentary sectional view on an enlarged scale taken generally along line 4—4 of FIG. 2 in the direction of the arrows.

The location of the chase 28 on the chase carrier 26 is facilitated by a pair of horizontal alignment pins 58 which project from the front face 38 of the chase carrier. As best shown in FIG. 4, bushings 60 are fitted in passages 62 near the edge of chase 28 at locations to register with the alignment pins 58. It is noted that pair of the busings 62 are located adjacent to both of the edges of the chase which are opposite to the edges which are provided with the notches 52. Consequently, whenever either one of the edges which contain the notches 52 is positioned downwardly, two of the bushings 60 are located such that they register with the alignment pins 58. When the bushings and alignment pins are in registration, the chase 28 is located such that it is centered on the optical axis 36 of the machine. The alignment pins 58 may be circular, hexagonal, or any other suitable shape, with the openings in the bushings 60 being complemental in shape. Normally one circular pin and one hex pin are used to make chase placement easier.

The suspension system provided by the present invention includes five identical studs or pins which take the form of externally threaded set screws 64, 66, 68, 70 and 72. Each set screw is identical and is carried on the chase in the manner best shown for the set screw 64 in FIG. 4. Alternatively, the set screws could be located on the chase carrier with the three mating points on each chase. The set screw 64 is threaded into and through an internally threaded passage 74 formed in the chase 28. Each set screw terminates in a rounded tip such as indicated at 64a in FIG. 4, and the tip 64a protrudes beyond the front face of the chase 28. Preferably, a hexagonal socket or another socket is provided in the end of each set screw opposite the tip.

The set screws are strategically located on the chase in the manner shown in FIG. 2. Set screws 64 and 66 are located generally along the edge of the chase which is the uppermost edge when the chase is oriented as shown in FIG. 2. Set screw 64 is located near the left edge of the chase, while set screw 66 is located near the right edge. Set screw 68 is located near the lower edge of the chase midway between the opposite side edges. Set screw 70 is located near the junction between the lower edge and the right edge of the chase. Finally, set screw 72 is located near the left edge of the chase midway between the top and bottom edges.

The set screws 64-72 are adjusted until their tips are all located in a common plane which is perpendicular to the plane which contains the flat glass panel 42. Preferably, a suitable liquid adhesive is applied to the threads of the set screws and sets up to lock the set screws in place once they have been adjusted properly such that their tips lie in a plane perpendicular to that of the glass panel 42. The adhesive thereafter prevents the set screw from becoming mis-adjusted.

The set screws 64-72 bear against three contact points on the chase carrier 26 which are provided by three pegs 76. As best shown in FIG. 4, each peg 76 is fitted in a passage 78 formed through the chase carrier. Each peg 76 has an enlarged head which seats against a flat shoulder 88 which is spaced a preselected distance from the face 38 of the chase carrier. Each peg 76 has a flat tip or end 81 which protrudes beyond the face 38 by a preselected distance to provide a contact point for the corresponding set screw to bear against when the chase is mounted in place on the chase carrier. The shoulders 80 are located such that the ends 81 of the three pegs 76 define a plane which is perpendicular to the optical axis 36 of the machine.

Figure 3:
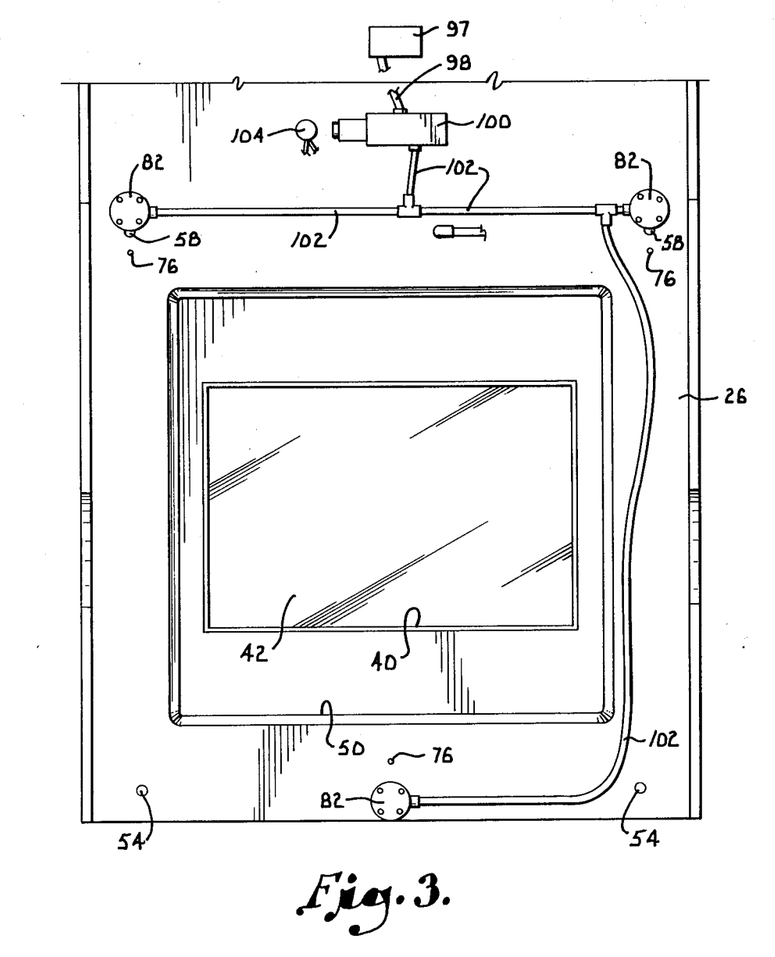
FIG. 3 is a fragmentary rear elevational view of the chase and chase carrier on an enlarged scale taken generally along line 3—3 of FIG. 1 in the direction of the arrows.

The pegs 76 are strategically located to match the pattern of the set screws 64-72. As best shown in FIG. 3, the two upper pegs 76 are located near opposite sides of the chase carrier for engagement with the set screws that are located near the upper edge of the chase. The third peg 76 is located below opening 50 midway between the opposite sides of the chase carrier for engagement with the set screw that is centered along the lower edge of the chase.

The chase 28 is clamped against the face 38 of the chase carrier 26 by a clamping system that is operated by three pneumatic cylinders 82. As best shown in FIG. 4, each cylinder 82 is mounted on the back side of the chase carrier 26 and includes a rod 84 which extends and retracts axially. Each rod 84 carries on its end a clamp 86 which is oriented at a right angle to the rod. Each clamp 86 is mounted to turn its rod 84 through an arc of 90° so that the clamp can be positioned in either of the two positions shown for the top two clamp in FIG. 2. When the clamp is rotated to the vertical position shown for the left hand clamp in FIG. 2, the clamp overlaps the edge of the chase 28. When rotated to the horizontal position shown for the right hand clamp. the clamp is clear of the edge of the chase.

Referring again to FIG. 4 in particular, each clamp 86 has a projecting finger portion 88 which may be clamped against the chase 28 to hold it in place. The surface of the finger 88 which confronts the chase is provided with a slightly resilient pad 90. The opposite end portion of each clamp 86 is provided on the surface which confronts the chase carrier 26 with a pad 92.

The rod 84 of each cylinder extends from a piston 94 which is acted against by a compression spring 96 that urges the piston in a direction to extend the rod. Retraction of the cylinders 82 is effected by a pneumatic system which includes a conventional air compressor 97 (FIG. 3) which supplies air under pressure to a pneumatic line 98 leading to a three way solenoid valve 100. In one position of valve 100, air is supplied through it to additional pneumatic lines 102 which lead to the three cylinders 82 at locations to force the pistons 94 in a direction to retract their rods 84. In another position, valve 100 disconnects lines 98 and 102 and the lines 102 are exhausted through the valve so that the springs 96 then effect extension of the piston rods 84. A toggle switch 104 located on the face 38 of the chase carrier is preferably provided to control the application of electrical power to valve 100 in a manner to open and close the valve in accordance with the position of the switch 104.

The three clamps 86 are located over the three contact points of the suspension system which are effective at any one time. As best shown in FIG. 2, two of the clamps 86 are located adjacent the upper edge of the chase near its opposite side edges, while the third clamp is located along the lower edge of the chase midway between its side edges.

It is contemplated that each camera/projector 10 will be equipped with four chases which are identical to one another except that the glass panels 42 have different sizes for the different chases. The chases can be used interchangeably.

In use, each chase 28 is initially applied to the face 38 of the chase carrier 26 such that two of the selected notches 52 are seated on the pins 54. The upper two clamps 86 are turned horizontally at this point in order to avoid interfering with application of the chase to the chase carrier. The alignment pins 58 are received by the bushings 60 as the chase is applied to the chase carrier, thus assuring that the glass pane 42 is centered on the optical axis 36 of the machine. Then the clamps 86 are turned to extend vertically so that their fingers 88 overlap the edge portions of the chase. Switch 104 may then be operated to apply air under pressure to the clinders 82, thereby retracting each rod 84 to draw each of the clamps 86 against the front face of the chase 28. The air pressure thereafter maintains the chase securely clamped against the face 38 of the chase carrier.

When chase 28 is thus clamped in place, the only three points of contact between the chase and chase carrier are the contact points at which three of the pins 64-72 bear against the three pegs 76. As previously indicated, the ends 82 of the pegs 76 occupy a common plane which is precisely perpendicular to the optical axis 36 of the machine and the tips of the pins 64 define a plane that is parallel to the plane of the glass panel 42. Consequently, when the tips of the pins are held against the ends 82 of pegs 76, the glass pane 42 is maintained perpendicular to the optical axis 36. The flat copy may then be applied to the glass panel 42 and held flatly against it by vacuum applied to the vacuum channel 48. In this manner, the three point suspension system of the present invention assures that the copy is held perpendicular to the optical axis 36 within the necessary limits which depend in large part upon the depth of focus of the lens 22.

Because the three points at which the chase is clamped to the chase carrier are located over the three contact points of the suspension system, the contact points are securely held against one another and the clamping forces do not tend to bend or otherwise deform the chase 28. It is additionally pointed out that securely clamping the chase in place requires only that the toggle switch 104 be operated, and this requires much less time than is required to thread eight bolts into the machine as has been required in the past. By way of example, it typically takes three minutes or more to apply eight bolts, whereas activation of the toggle switch 104 typically takes five seconds at the most.

It should be noted that the chase can be applied with the glass pane 42 oriented such that its long axis is horizontal as shown in FIG. 2. In this case, set screw 64, 66 and 68 bear against the pegs 76 and the remaining two set screws 70 and 72 simply project into the space between the adjacent faces of the chase and the chase carrier. Each chase can also be maintained in an alternative orientation in which the glass panel 42 has its long axis oriented vertically. Then, the chase is rotated 90° counterclockwise from the position shown in FIG. 2, and the two other notches 52 are seated on pins 54. In addition, the two other bushings 60 are fitted on the alignment pins 58. When the chase is positioned in this orientation, set screws 66 and 70 are located along the top edge of the chase and bear against the two upper pegs 76. Set screw 72 is located along the bottom edge of the chase and bears against the lower peg 76. Against, the clamping forces are applied at locations adjacent to the suspension points. The two set screws 64 and 68 which are not used as bearing points simply project into the space presented between the confronting faces of the chase and chase carrier.

In order to release the chase for rotation or replacement, switch 104 is moved to cause valve 100 to exhaust the air pressure from the cylinders 82. Then, springs 96 automatically cause the cylinders to extend and release the clamps 86 from the chase. It is noted that even though the two upper clamps 86 are released from the chase, they remain in vertical orientations and prevent the chase 28 from falling forwardly off of the chase carrier. The chase can be removed by first turning each of the upper clamps 86 sideways so that the top edge of the chase can clear them. The chase can then simply be lifted off of the lower clamp if desired, since there is enough clearance to remove the chase without the need to turn the lower clamp sideways.

It is again pointed out that removal of the chase involves simply moving the switch 104 and can be accomplished in five seconds or less. This is to be compared with the three minutes or more that is required to move the eight bolts that are used in conventional chase holding arrangements. It has been found that a chase can be removed and replaced approximately 60 times faster than in the case where eight bolts are used to hold the chase in place.

The unique and strategic location of the set screws 64–72 allows them to function as bearing points for the suspension system in either of two operating positions of the chase. In addition, only five set screws are needed because one of the set screws (66) is used as a bearing point in both positions of the chase. It should be noted that the chase can be provided with only three bearing points and that the chase carrier could then be provided with five bearing points, only three of which would be used in each position of the chase. Either arrangement would accommodate the necessary capability of orienting the chase with long axis of the glass panel 42 either horizontal or vertical.

It is important to recognize that it is of no particular importance that the aluminum frame of the chase be at a perfect right angle to the optical axis. What is important is that the front face of the glass panel 42 which receives the copy be both planar and perpendicular to the optical axis. In order to insure planarity of the glass panel 42 and proper adjustment of the set screws 64, the following procedure can be followed, although other assembly techniques can also be employed.

The aluminum frame of the chase is placed on a holding fixture which elevates it about six inches above a work table surface. A properly sized glass panel 42 is placed on a horizontal steel support plate which is flat in order to assure that the glass panel remains flat and is not distorted or unduly stressed. The edges of the glass panel project outwardly beyond the support plate. The support plate is then adjusted in elevation until the front (upper) face of the glass is at the same elevation as the front (upper) face of the aluminum chase frame, as shown by suitable instruments which measure the surfaces of the glass and frame adjacent the intersections therebetween. The glass panel is then removed from the support plate, a bead of liquid silicone rubber adhesive 46 is applied to the corner area of the shoulder 44, and the glass is applied again to the support plate and pressed down onto shoulder 44. This squeezes the adhesive 46 into the small gap between the edge of the glass panel and the perimeter of the aperture 40, as shown in FIG. 5. Most of the rest of the adhesive remains as a meniscus between the panel 42 and shoulder 44, thus enhancing the adhesion between the panel and frame of the chase. After curing, the adhesive can be cut away at any places where it is squeezed out from between the glass and metal frame.

After the adhesive 46 has cured (which typically requires about 12 hours), the chase is moved onto a granite surface table which is perfectly level. A shim (about 0.020 inch thick) is placed under the frame of the chase at each of three points corresponding to the locations of three of the set screws (such as screws 64, 66, and 68). The three screws 64–68 are then coated on their threads with a suitable liquid adhesive and threaded into and through the passages 74 in the chase frame (from the top) until their tips project far enough to raise the chase off of the granite table surface such that the glass panel 42 is above the table surface by a preselected distance (preferably 0.550 inch) and is perfectly level. Since the table surface is level, this assures that the plane of the glass panel will be parallel to the plane defined by the tips of the three screws 64, 66, and 68.

The shims are then moved to the three points corresponding to the locations of the three screws 66, 70 and 72. Screws 70 and 72 are coated on their threads with liquid adhesive and threaded into and through the appropriate passages in the chase frame until the glass panel is again level. This esstablishes the tips of screws 70 and 72 in the same plane as the tips of the other three screws 64 and 68. The set screws 64–72 are maintained in an immobilized condition until the adhesive coating on their threads has set up to permanently lock the screws rigidly in place.

It is noted that the chase carrier 26 takes the form of a plate which is thicker and heavier than the chase, since the chase carrier must exhibit strength and stability. After the three pegs 76 have been positioned in passages 78 and seated on the shoulders 80, the tips 81 of the pegs are swept with optical or laser instruments to assure that they lie in a plane which is perpendicular to the optical axis 36 of the machine. It is not important for the chase carrier face 38 to be precisely in any particular orientation; however, the ends of pegs 76 must define a plane perpendicular to the optical axis since they provide the bearing surfaces for the pins on the various chases that are used interchangeably on the machine.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. A copy holding device for use in a photoreproduction machine having an optical axis, said device comprising:
    a chase carrier;
    means for providing on said chase carrier three spaced apart bearing points occupying a plane perpendicular to the optical axis of the machine;
    a chase having a planar face for receiving flat copy bearing images which are to be reproduced;
    three spaced apart bearing points on said chase defining a plane parallel to said planar face; and means for mounting said chase on said chase carrier with said bearing points on the chase held against said bearing points on the chase carrier to maintain said face of the chase perpendicular to the optical axis of the machine.

2. The device of claim 1, wherein said bearing points on the chase are defined of pins projecting from the chase.

3. The device of claim 2, including:
an internally threaded passage in the chase for each pin; and
external threads on each pin mating with the corresponding passage to allow the pins to be threaded into or out of the passages for adjustment of said tips relative to said face of the chase.

4. The device of claim 3, including means for locking each pin against threaded movement in the corresponding passage once the pin has been adjusted.

5. The device of claim 2, wherein said bearing points on the chase carrier are defined by tips of pegs projecting from the chase carrier.

6. The device of claim 1, wherein said bearing points on the chase carrier are defined by tips of pegs projecting from the chase carrier.

7. The device of claim 6, including a passage in said chase carrier for each peg, each passage presenting a shoulder therein against which the corresponding peg is seated to position the peg with the tip thereof projecting beyond the chase carrier.

8. The device of claim 1, wherein said mounting means comprises:
a power element on the chase carrier adjacent each bearing point thereon, each power element having an extensible and retractable rod;
a clamp member carried on each rod at a location to engage the chase adjacent the corresponding bearing point thereon in a manner to clamp the bearing points of the chase and chase carrier together when the rod is retracted and to release from the chase to permit removal of same from the chase carrier when the rod is extended; and
power means for effecting selective extension and retraction of said rods.

9. The device of claim 8, wherein:
each power element comprises a fluid cylinder; and
said power means comprises means for applying fluid pressure to and relieving fluid pressure from each cylinder.

10. The device of claim 8, wherein each clamp member is mounted to turn on its rod through an arc of at least 90° when the clamp member is released from the chase.

11. The device of claim 1, wherein:
said chase is substantially square and includes first and second pairs of parallel edges;
two of said bearing points on the chase are located adjacent one edge of said first pair and adjacent the opposite edges of the second pair; and
the third bearing point on the chase is located adjacent the edge of said first pair opposite said one edge thereof and substantially midway between the opposite edges of the second pair.

12. The device of claim 11, including:
a fourth bearing point on the chase adjacent said opposite edge of the first pair and one edge of the second pair; and
a fifth bearing point on the chase located adjacent the edge of the second pair opposite said one edge thereof and substantially midway between the opposite edges of the first pair,
whereby the chase may be positioned against the chase holder in a first position wherein said three bearing points of the chase are in contact with the bearing points of the chase carrier and in a second position rotated 90° from the first position wherein said fourth and fifth bearing points and one of said three bearing points on the chase are in contact with the bearing points on the chase carrier.

13. A copy holding mechanism for a camera/projector having an optical axis, said mechanism comprising:
a chase carrier having a substantially flat face oriented generally perpendicular to said optical axis;
a chase having a surface for receiving flat copy bearing images which are to be photoreproduced, said chase being applicable to said flat face of the chase carrier and having a peripheral edge portion;
a plurality of power elements each having an extensible and retractable rod, said power elements being mounted on the chase carrier at spaced apart locations;
a clamp member mounted on each rod, said clamp members being arranged to engage the chase adjacent said peripheral edge portion thereof in a manner to clamp the chase against said flat face of the chase carrier when the rods are retracted and to release from the chase to permit removal of the chase from the chase carrier when the rods are extended; and
power means for effecting selective extension and retraction of said rods.

14. The mechanism of claim 13, wherein each clamp is mounted on the corresponding rod for pivotal movement through an arc of at least approximately 90° about the axis of the rod.

15. The mechanism of claim 13, including means for establishing three points of contact between the chase and said flat face of the chase carrier when clamped together, said three points providing the sole points of contact between the chase and chase carrier.

16. The mechanism of claim 15, wherein:
said clamp members are three in number; and
said clamp members are engageable with the chase adjacent the respective three points of contact when said rods are retracted.

17. The mechanism of claim 13, wherein:
each power element comprises a fluid operated clinder; and
said power means comprises means for selectively applying fluid pressure to and relieving fluid pressure from each cylinder.

18. The mechanism of claim 17, wherein each clamp is mounted on the corresponding rod for pivotal movement through an arc of at least approximately 90° about the axis of the rod.

19. In a camera/projector of the type having an optical system defining a generally horizontal optical axis, a chase which includes a frame containing a planar transparent panel for receiving flat copy bearing images to be photoreproduced, and a chase carrier presenting a generally vertical face for receiving the chase, the improvement comprising:
means for providing on said face of the chase carrier three bearing points arranged thereon in a preselected pattern and cooperating to define a plane oriented perpendicular to said optical axis;

means for providing on said frame of the chase three bearing points arranged thereon in said preselected pattern and cooperating to define a plane oriented parallel to the plane of said transparent panel, said chase being applicable to said chase carrier in a predetermined position wherein said bearing points of the chase and chase carrier are in contact to maintain the transparent panel perpendicular to the optical axis; and releaseable means for securing said chase in said predetermined position.

20. The improvement of claim 19, including three pins projecting from the chase frame and terminating in tips which provide said three bearing points on said frame of the chase.

21. The improvement of claim 20, including a threaded connection between each pin and the frame of the chase to permit each pin to be adjusted in a threaded manner to move the tip thereof toward and away from the plane of the transparent panel.

22. The improvement of claim 20, including three pegs projecting from said vertical face of the chase carrier and terminating in tips which provide said three bearing points on the face of the chase carrier.

23. The improvement of claim 19, wherein said releaseable means is operable to clamp the chase frame against said face of the cahse carrier at three locations adjacent the respective points of contact between said bearing points.

24. The improvement of claim 23, wherein said releaseable means comprises:
a power element on the chase carrier adjacent each bearing point thereon, each power element having an extensible and retractable rod;
a clamp member carried on each rod at a location to engage the chase adjacent the corresponding bearing point thereon in a manner to clamp the bearing points of the chase and chase carrier together when the rod is retracted and to release from the chase to permit removal of same from the chase carrier when the rod is extended; and
power means for effecting selective extension and retraction of said rods.

25. The improvement of claim 24, wherein:
each power element comprises a fluid operated cylinder; and
said power means comprises means for applying fluid pressure to and relieving fluid pressure from each cylinder.

26. The improvement of claim 24, wherein each clamp member is mounted to turn on its rod through an arch of at least 90° when the clamp member is released from the chase.

27. The improvement of claim 19, wherein:
said chase is substantially square and includes first and second pairs of parallel edges;
two of said bearing points on the chase are located adjacent one edge of said first pair and adjacent the opposite edges of the second pair; and
the third bearing point on the chase is located adjacent the edge of said first pair opposite said one edge thereof and substantially midway between the opposite edges of the second pair.

28. The improvement of claim 27, including:
a fourth bearing point on the chase adjacent said opposite edge of the first pair and one edge of the second pair; and
a fifth bearing point on the chase located adjacent the edge of the second pair opposite said one edge thereof and substantially midway between the opposite edges of the first pair,
whereby the chase may be positioned against the chase holder in a first position wherein said three bearing points of the chase are in contact with the bearing points of the chase carrier and in a second postion rotated 90° from the first position wherein said fourth and fifth bearing points and one of said three bearing points on the chase are in contact with the bearing points on the chase carrier.

29. In a camera/projector having an optical system defing a generally horizontal optical axis, a chase carrying a planar transparent panel for receiving flat copy bearing images to be photoreproduced, and a chase carrier presenting a generally vertical face for receiving the chase, the improvement comprising:
means for providing three bearing points selectively spaced apart on said face of the chase carrier at locations to define a generally vertical plane perpendicular to said optical axis;
three pins projecting from said chase at locations to register with said bearing points when the chase is applied to the chase carrier, said pins being located outwardly of said transparent panel and terminating in tips which define a plane parallel to the plane of said panel; and
releaseable means for securing said chase to said chase holder with said transparent panel generally centered on said optical axis and said tips of the pins in contact with the respective bearing points on the chase carrier to maintain said transparent panel perpendicular to the optical axis.

30. The improvement of claim 29, wherein said releaseable securing means includes three clamp members which can be clamped against the chase at locations adjacent the pins.

31. The improvement of claim 30, wherein said releaseable securing means comprises:
three fluid operated cylinders each having a rod which extends and retracts axially under the influence of fluid pressure, said clamp members being carried on the respective rods; and
means for selectively applying fluid pressure to and relieving fluid pressure from said cylinders.

32. The improvement of claim 31, wherein each clamp member is mounted to turn on its rod through an arc of at least 90° when the clamp member is released from the chase.

33. A method of maintaining a planar panel which holds copy perpendicular to an optical axis in a photoreproduction machine having a chase carrying said panel and a chase carrier for holding the chase, said method comprising the steps of:
providing three spaced apart bearing points on said chase carrier arranged in a preselected pattern and defining a plane oriented perpendicular to the optical axis;
providing three spaced apart bearing points on said chase arranged in said preselected pattern and defining a plane oriented parallel to the plane of said panel; and
securing the chase to the chase carrier with said bearing points of the chase contacting the respective bearing points of the chase carrier to provide the sole contact points between the chase and chase carrier, whereby the copy holding panel is oriented perpendicular to the optical axis.

* * * * *

UNITED STATES PATENT AND TRADEMARK OFFICE
Certificate

Patent No. 4,847,664                                                      Patented July 11, 1989

On petition requesting issuance of a certificate for correction of inventorship pursuant to 35 USC 256, it has been found that the above-identified patent, through error and without any deceptive intent, improperly sets forth the inventorship. Accordingly, it is hereby certified that the correct inventorship of this patent is:
Joseph H. Wally, Jr., Herbert W. Pace, Victor E. Hutchinson and James D. Parks Signed and Sealed this Tenth Day of April 1990.

L.T. HIX                                                           *Supervisory Patent Examiner*
                                                                         *Art Unit 211*